C. F. HAMILTON.
FAUCET CONNECTION.
APPLICATION FILED SEPT. 19, 1912.
1,117,840.
Patented Nov. 17, 1914.
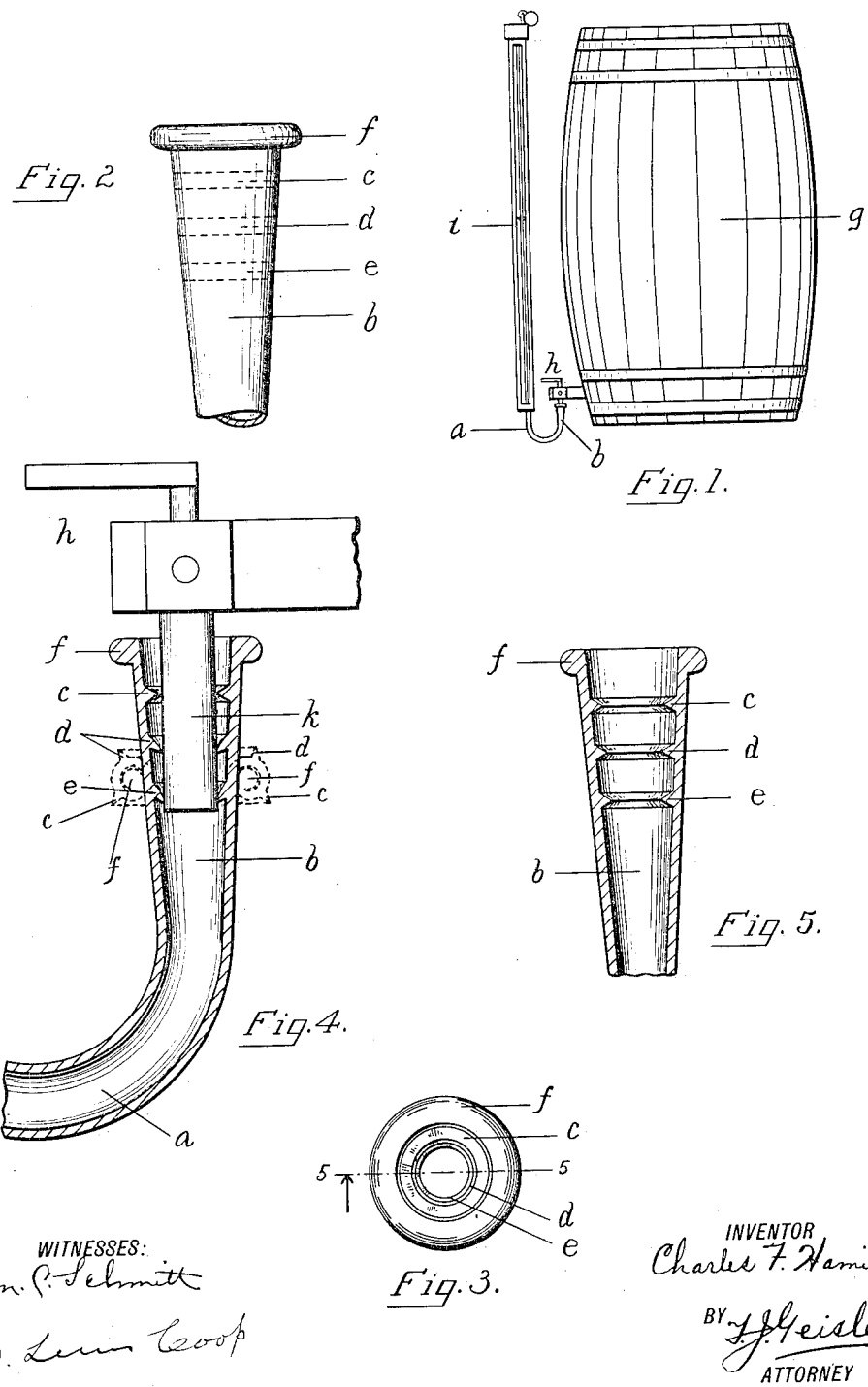

UNITED STATES PATENT OFFICE.

CHARLES F. HAMILTON, OF PORTLAND, OREGON, ASSIGNOR TO ADJUSTABLE LIQUID GAUGE COMPANY, A CORPORATION OF OREGON.

FAUCET CONNECTION.

1,117,840.  Specification of Letters Patent.  Patented Nov. 17, 1914.

Application filed September 19, 1912. Serial No. 721,321.

*To all whom it may concern:*

Be it known that I, CHARLES F. HAMILTON, a citizen of the United States, and a resident of Portland, county of Multnomah, and State of Oregon, have invented a new and useful Improvement in Faucet Connections, of which the following is a specification.

My invention has for its object the providing of a tubular faucet connection made of elastic material and having an end which is specially adapted to be expeditiously slipped over a pipe-end, or the spout of a faucet, and when so affixed will be securely held in place.

My invention further has for its object the adaptation of the end of the tube for use on pipes and spouts of different diameter without affecting its efficiency in any manner.

To this end my invention substantially consists of a tube made of elastic material and having conically enlarged end, or ends, provided with a rounded rim and a plurality of internal, tapered gripping lips located as shown in the accompanying drawings constituting a part of this specification.

In the drawings: Figure 1 is a side elevation of a barrel and liquid gage connected by means of a flexible tube embodying my invention; Fig. 2 is a side elevation of one of the conically enlarged ends of my tube; Fig. 3 is a top view related to Fig. 2; Fig. 4 is a vertical, longitudinal section of one of said conically enlarged ends of my tube affixed on the spout of a faucet, as illustrated in Fig. 1; the action of the gripping lips provided on the interior of the conically enlarged end of the tube, in gripping the spout of a faucet, being particularly illustrated; and Fig. 5 is a vertical, longitudinal section of said conically enlarged end, the section being taken on the line 5—5 of Fig. 3, looking in the direction indicated; in this view is shown the normal state of the internal gripping lips.

A flexible tube, $a$, has either one or both of its ends made with conically enlarged portions, as illustrated by $b$. Said conical enlarged end, $b$, is provided on its interior periphery with a series of annular lips, $c$, $d$, $e$, concentric about a common axis and spaced apart. These annular lips are preferably V-shaped in cross-section, as shown in Fig. 5, and are also preferably consecutively smaller, relative to their distance from the mouth of the conically enlarged end. On the exterior of said end, $b$, of the tube is a flange $f$, which affords an easy means by which the tube may be rolled back on itself, as below explained.

In order to explain more clearly how my device is used, I have shown, in Fig. 1, one mode of its practical application. A barrel, $g$, having a faucet $h$, has attached to it a liquid gage $i$, the connection being made by a tube $a$ embodying my invention.

The larger sized detail, Fig. 4, illustrates how the V-shaped annular lips take hold of the spout of the faucet $k$.

The conically enlarged end of my tube is affixed and removed as follows: The said end is slipped over the spout of the faucet and forced upward until the end of said faucet is gripped by one or two of the lips as, in this specific case, $d$, $e$. Said lips will assume positions as shown in Fig. 4, and the grip thus obtained by the tube-end on the spout will be liquid tight. For when any pull is exerted on the tube the lips gripping the spout will have a tendency to resume their normal position, but are restrained for the reason that, in order to do so, it will be necessary for them to bulge outward, and this is prevented by the resistance in the body portions of the tube between the lips.

In order to provide for an easy removal of the tube-end, I have provided the exterior flange $f$. By the act of stripping the tube-end off the spout $k$, the tube-end will be rolled up over itself, as illustrated in dotted outlines in Fig. 4, thereby facilitating the removal of the tube-end from the spout. This result is attained by reason of the conical form of the tube end, the arrangement and location of the rim $f$ and the internal ribs, $c$, $d$, $e$, and the thin flexible web of connecting material between the rim and the ribs. For, by reason of the elastic property of the body of the tube end, and the spacing apart of the rim $f$ from the rib $c$, the former may be readily rolled back, since, in the act of so rolling, the body portion between the rim $f$ and rib $c$ may be displaced interiorly, having ample room allowed it to be so displaced; and the operation may in like manner be continued until said end assumes approximately the position shown in dotted outline in Fig. 4, for the ribs $c$ and $d$ will be placed outward, as shown in said dotted lines, and will, by reason of the elastic property of the material, admit of being readily stretched as mentioned; the rim $f$ serving as a fulcrum, as it were, over which the tube end is stretched and rolled, as represented in Fig. 4.

The construction I have shown herein provides a connection which may be easily attached to or removed from pipes of various gages or diameter without any adjustments whatever; which will at the same time be liquid tight and will not be pulled off accidentally.

I claim:

A faucet connection comprising a tube made of elastic material having a conically enlarged end, said end made with an external annular rim and with internal annular ribs connected by a thin flexible web, the internal ribs being of equal cross section but spaced equidistantly from each other, whereby the removal and fastening of said connection is facilitated.

C. F. HAMILTON.

Witnesses:
 WM. C. SCHMITT,
 W. LEWIS COOP.